United States Patent
Bahnsen et al.

(10) Patent No.: US 7,578,959 B2
(45) Date of Patent: Aug. 25, 2009

(54) METHOD AND APPARATUS FOR CREATING A BLOW MOLDED CASE

(75) Inventors: Clay Bahnsen, Clinton, IA (US); Michael L. Grinnall, Clinton, IA (US); Daniel E. Koranda, Clinton, IA (US); James W. Wiese, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 0 days.

(21) Appl. No.: 12/016,729

(22) Filed: Jan. 18, 2008

(65) Prior Publication Data

US 2008/0111285 A1 May 15, 2008

Related U.S. Application Data

(62) Division of application No. 10/958,824, filed on Oct. 5, 2004.

(51) Int. Cl.
*B29C 49/50* (2006.01)
(52) U.S. Cl. .............. 264/531; 264/154; 264/163; 425/289; 425/290; 425/296; 425/522; 425/525; 425/527; 425/531
(58) Field of Classification Search ......... 425/289, 425/290, 296, 522, 525, 527, 531; 264/154, 264/163, 531
See application file for complete search history.

(56) References Cited

U.S. PATENT DOCUMENTS

| | | | |
|---|---|---|---|
| 3,317,995 A | 5/1967 | Bord ................... 18/5 |
| 3,327,841 A | 6/1967 | Schurman et al. ........... 206/1 |
| 3,339,781 A * | 9/1967 | Schurman et al. ........... 206/592 |
| 3,822,083 A | 7/1974 | Zeamer ................. 312/208 |
| 4,340,139 A * | 7/1982 | Wilcox et al. ............ 206/349 |
| 6,102,156 A * | 8/2000 | Lipniarski ............. 182/118 |
| 2003/0104098 A1 | 6/2003 | Schrader |
| 2004/0197436 A1 | 10/2004 | Anderson et al. |

FOREIGN PATENT DOCUMENTS

| | | |
|---|---|---|
| CA | 968520 A | 6/1975 |
| JP | 61171322 A * | 8/1986 |

OTHER PUBLICATIONS

Partial European Seaerch Report, Feb. 27, 2008, 6 Pages.

* cited by examiner

*Primary Examiner*—Robert B Davis
(74) *Attorney, Agent, or Firm*—St. Onge Steward Johnston & Reens LLC

(57) ABSTRACT

A method and apparatus for blow molding a case for housing an object, such as a tool, is disclosed generally comprising first and second mold portions located adjacent each other to create separate cavities for forming base and lid portions of a case and a punch for each portion corresponding to the outline of an object. In certain embodiments, the punch protrudes into the cavity during blow molding to create a sidewall to facilitate a press fit. In some embodiments, additional punches and/or recesses are provided to produce additional apertures or flanges in the walls of the tool case.

46 Claims, 4 Drawing Sheets

METHOD AND APPARATUS FOR CREATING A BLOW MOLDED CASE

CROSS-REFERENCE TO RELATED APPLICATIONS

This application is a divisional of U.S. patent application Ser. No. 10/958,824 filed Oct. 5, 2004, which is currently pending.

FIELD OF THE INVENTION

The present invention relates to a method and apparatus for creating blow molded cases. More specifically, the invention relates to a method and apparatus for creating double wall cases with a punched area for housing an object.

BACKGROUND OF THE INVENTION

The use of blow-molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

One such article that is commonly manufactured in this manner is double wall cases. By producing cases in this manner, one is able to produce a device that is capable of carrying and protecting tools placed inside the case that has a multitude of desirable physical characteristics—such as rigidity, scuff resistance, and impact absorption—yet that is relatively inexpensive to manufacture. Typically, these cases will be formed using the process described above, where one mold half forms the exterior of both the base and lid portions of the case, while the other mold half forms the interior of both base and lid portions. Usually, the mold half forming the exterior of the case forms a wall with a smooth, attractive shape, while the mold half that forms the interior of the case is often molded with compartments to hold specific contents, such as, for example, a pistol-type soldering iron and various tips therefore. In fact, a particular advantage of manufacturing cases in this way is that the walls formed by the two mold halves do not need to match, as the space between these walls is filled with air.

One disadvantage of these cases, however, as that, due to their double wall nature, they tend to be both heavy and cumbersome. Accordingly, it has been suggested to cut out sections of the interior walls of the case in order to utilize the wasted volume of space between the double walls. By doing so, the case can be made smaller in light of the fact that this previously unused space is now being used to house the tool. Moreover, by removing sections of the walls, the case also decreases significantly in weight. As a result, it is also much easier to mold the design of the interior of the case, as it is no longer necessary to create deep molded compartmentation, and fewer molding rejects also result.

An example of this approach is disclosed in U.S. Pat. No. 3,317,955 to Schurman, et al., which discloses the earliest known double wall case blow-molded case, illustrating a rectangular cutout of most of the inside wall of the base portion. Another example is disclosed in U.S. Pat. No. 3,327,841 to Shurman, et al., which illustrates a partial cutout shaped to accommodate the outline of a pistol-type soldering gun. The gun is further supported by a cradle molded in the outside wall of the base portion of the case, while the space under the uncut portion of the inside base is usable for storage of an electric cord, thereby maximizing the utilization of what was previously wasted unused space.

However, one problem with removing wall sections in blow-molded cases as shown in these disclosures is that, because the blow molding process involves the use of a parison with a continuous, unbroken surface, the mold itself cannot produce any holes in the blow-molded wall other than the hole or holes through which the fluid pressure is introduced. Therefore, removing these sections typically involves an additional manufacturing step, where these wall sections are cut or burned after the blow molding process is completed and the case has been ejected from the mold. For example, cutting the inner wall was often accomplished with the use of a small circular saw blade mounted to a router and guided by a molded vertical lip surrounding the area to be cut. The router was fixed and the case was moved around the router axis by hand or by mechanical means. Round holes are often cut with hole saws, or occasionally, are burned. Cutting or burning these holes after the blow molding process is completed, however, requires additional tooling and additional manufacturing steps, entailing further difficulty, time, and expense. Moreover, the process produces unwanted sawdust or charred material around the cutout lip.

Another disadvantage of removing the wall sections after the blow molding process is complete is that the blow-molding process itself takes an unnecessarily long time. Generally, when a double wall case is blow molded using injections of fluid through one or more needles, the amount of air that can be circulated within the case is severely limited. Accordingly, the amount of heat that can be removed from the inside plastic walls is also limited, and thus, because these walls must be cooled before the part can be ejected from the mold, the blow-molded cycle is slow. Similarly, draining the blowing fluid through one or more needle orifices at the end of the blowing cycle is a relatively slow process, and because the case cannot be ejected from the mold until he internal air pressure has returned nearly to atmospheric pressure, the process is somewhat slow.

What is desired, therefore, is a blow-molded case that is double walled, but is not heavy or cumbersome. What is also desired is a case that is easy and inexpensive to manufacture. What is further desired is a blow-molded case that does not produce residual sawdust and/or charred plastic. What is also desired is a case that does not require a long blow molding cycle.

SUMMARY OF THE INVENTION

Accordingly, it is an object of the present invention to provide a double wall case that utilizes the space between the walls of the case.

It is a further object of the present invention to provide a double wall case that does not require additional manufacturing steps after the blowing cycle.

It is yet another object of the present invention to provide a double wall case that does not require cutting or burning during manufacture.

It is still another object of the present invention to provide a double wall case that does not require a long time to cool the inside plastic walls of the case during manufacture.

It is yet another object of the present invention to provide a double wall case that does not require a long time to drain blowing fluid from the case during manufacture.

In order to overcome the deficiencies of the prior art and to achieve at least some of the objects and advantages listed, the invention comprises an apparatus for creating a blow-molded case for housing an object, including a mold comprising first and second mold portions that, when located adjacent each other, have first and second mold surfaces at least partially defining first and second cavities, the cavities having first and second cavity surfaces, respectively, against which first and second walls of the blow-molded case are blown, respectively, during blow molding, and a first punch having a punching surface at least part of which corresponds to at least part of the outline of the object, wherein, when the first punch is in an unactivated position, the first cavity surface includes the first mold surface and at least part of the first punch and, when the first punch is in an activated position, at least part of the first punch is extended past the first wall of the blow-molded case and inside the first cavity such that a first hole, at least part of which corresponds to at least part of the outline of the object, is created in the first wall of the blow-molded case.

In another embodiment, the invention comprises a method for creating a blow-molded case for housing an object, including providing a mold having first and second mold portions, providing a first punch, wherein the first punch has a punching surface at least part of which corresponds to at least part of the outline of the object, moving the first mold portion adjacent to the second mold portion, thereby at least partially enclosing first and second cavities having first and second cavity surfaces, respectively, blowing a first wall of the blow-molded case against the first cavity surface and a second wall of the blow-molded case against the second cavity surface, and extending at least part of the first punch through the first wall of the blow-molded case and into the first cavity, thereby creating a first hole in the first wall of the blow-molded case.

In yet another embodiment, the invention comprises a blow-molded case for housing an object, including a double wall base portion having a first cavity for housing at least part of the object, a double wall lid portion connected to the base portion, the lid portion having a second cavity for housing at least part of the object, and wherein one of the base and lid portions has a first punched hole at least part of which corresponds to at least part of the outline of the object for receiving the object.

In still another embodiment, the invention comprises a method for creating a blow-molded case for housing an object, including moving a first mold portion adjacent to a second mold portion, thereby creating first and second cavities, blowing first and second walls of the blow-molded case against the first and second cavities, respectively, and punching a hole, at least part of which corresponds to at least part of the outline of the object, in the first wall of the blow-molded case.

DETAILED DESCRIPTION OF THE INVENTION

Figures 1A, 1B:
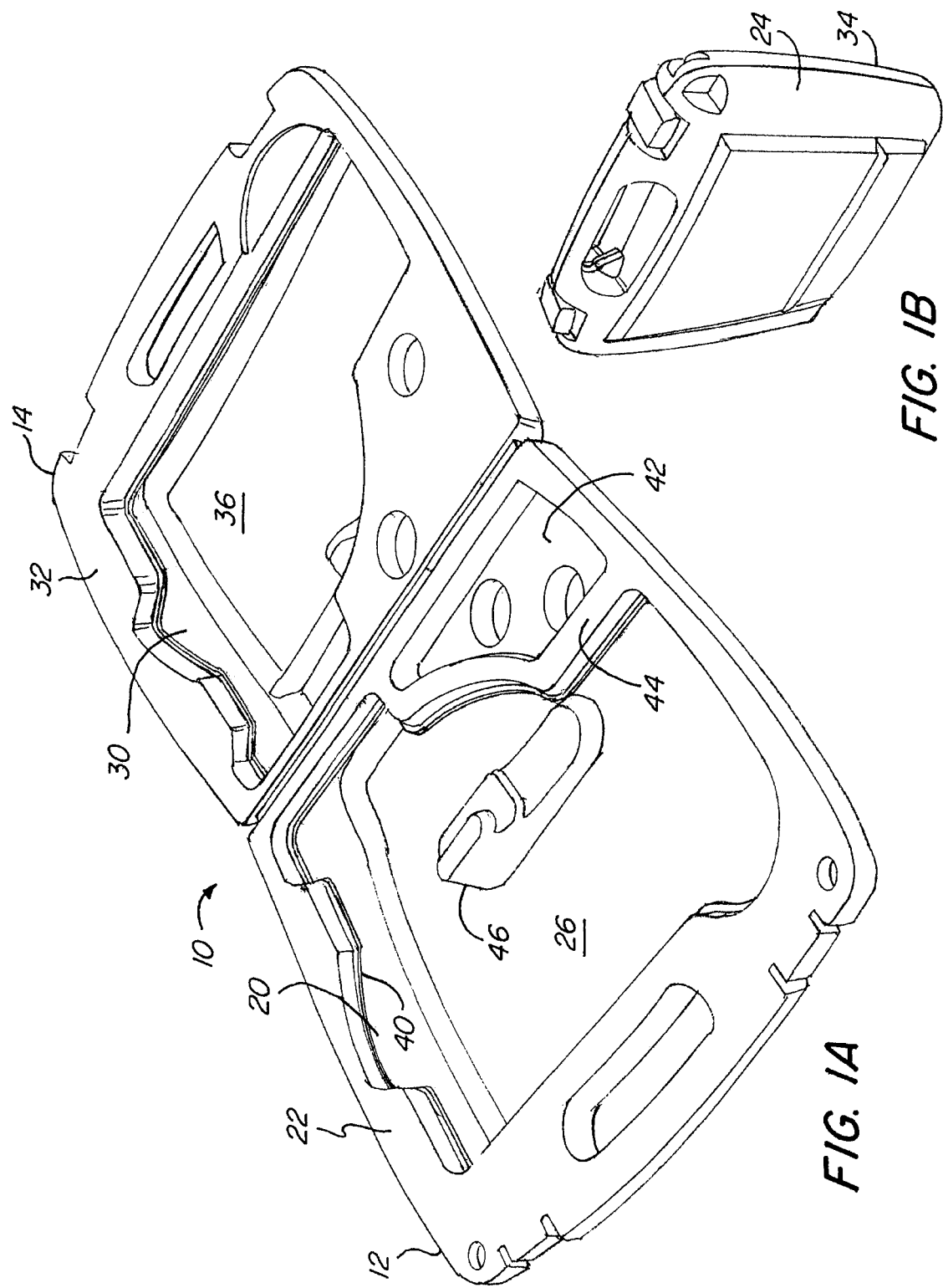
FIG. 1A is a perspective view of a tool case in the open position made in accordance with the invention.
FIG. 1B is a perspective view of the tool case of FIG. 1 in the closed position.

The basic components of one embodiment of a double wall blow molded tool case in accordance with the invention are illustrated in FIG. 1A. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

The case 10 includes a double wall base portion 12 and a double wall lid portion 14. The base portion 12 has a punched hole 20 in its inner wall 22 that corresponds to the outline of an object, such as a tool, to be housed by the tool case 10. Accordingly, the hole 20 and the space between the inner wall 22 and the outer wall 24 provide a cavity 26 in which the tool can be placed.

Similarly, the lid portion 14 includes a punched hole 30 in its inner wall 32. Accordingly, the hole 30 and the space between the inner wall 32 and outer wall 34 provide a cavity 36 for accommodating the top of the tool when the tool case 10 is closed, as shown in FIG. 1B. In certain advantageous embodiments, the hole 30, like the hole 20, corresponds to the outline of the tool to provide a more secure fit.

In some embodiments, a sidewall 40 substantially perpendicular to the plane of the punched hole 20 runs along the perimeter of the hole 20, providing a press fit insertion of the tool into the cavity 26. Additionally, in certain embodiments, an additional punched aperture 42, which may be a through hole or a blind hole, is provided to permit accessories—such as, for example, drill bits, or, as another example, a power cord—to be stored therein. In some of these embodiments, a flange 44 is provided adjacent the hole 20 and aperture 42 in order to provide for greater rigidity. Also, in certain embodiments, at least one boss 46 in the outer wall 24 is provided to engage a particular shape or aperture in the tool, such as a handle. Depending on the particular embodiment and on the particular tool for which the tool case 10 is designed, one or more of the above-described features may be provided in the lid portion 14 in addition to, or in lieu of, the presence of these features in the base portion 12.

Figure 2:
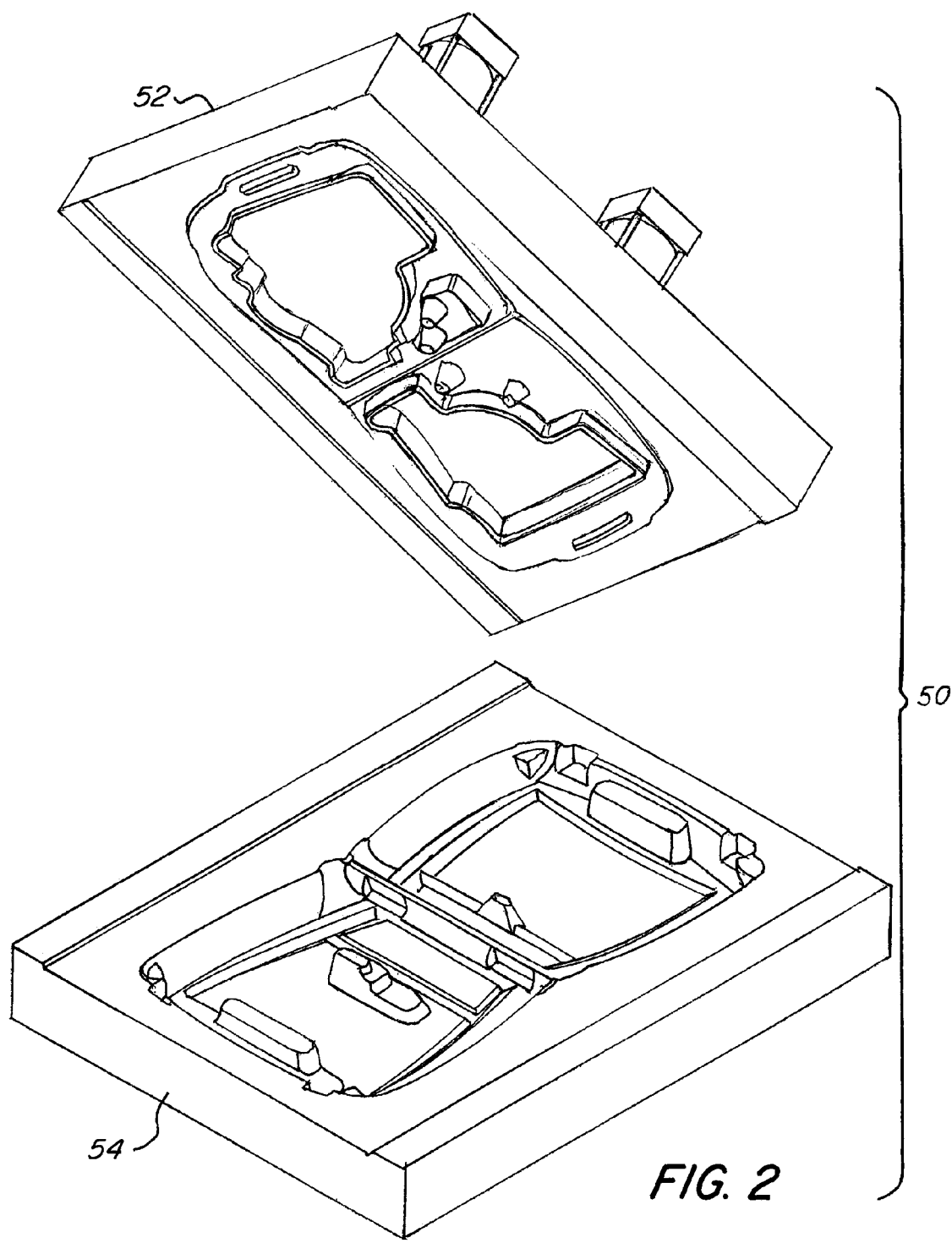
FIG. 2 is a perspective view of an apparatus in accordance with invention for making the tool case of FIG. 1.
Figure 3A:
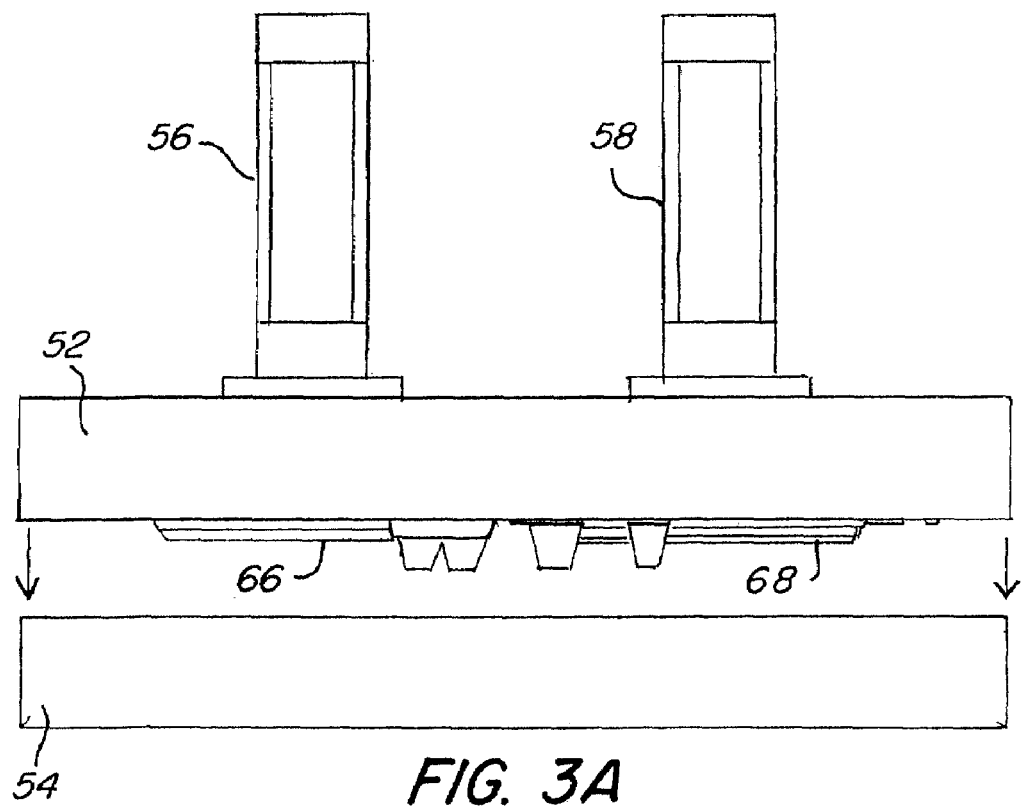
FIG. 3A is a side view of one embodiment of the apparatus of FIG. 2 in an open position.
Figure 3B:
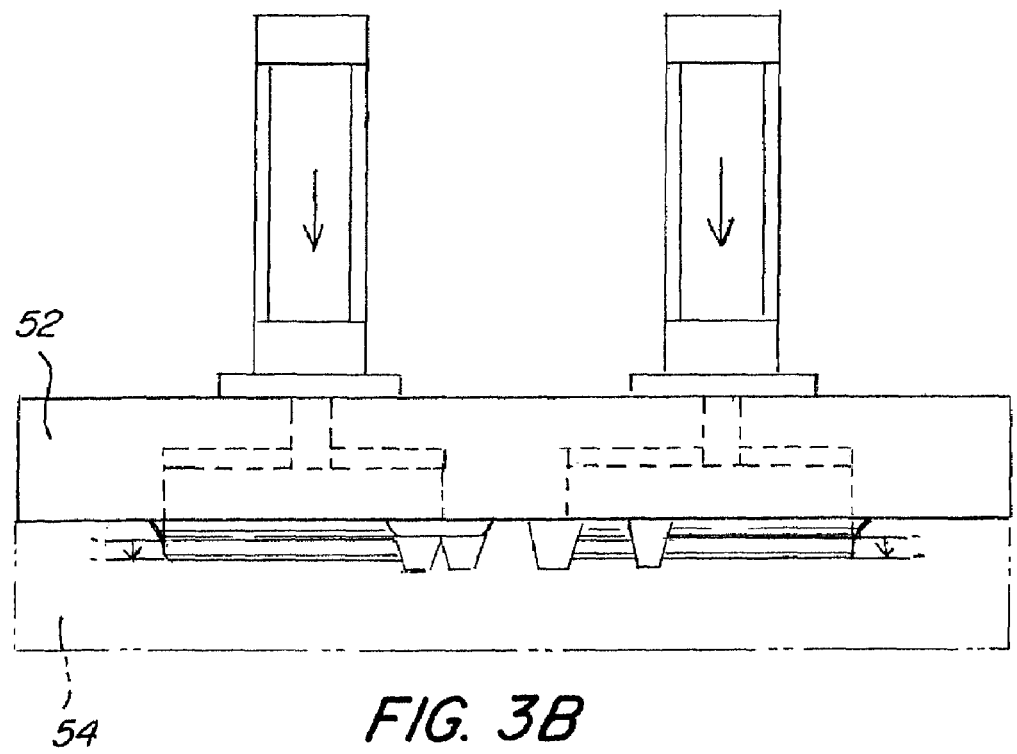
FIG. 3B is a side view of the apparatus of FIG. 3A in a closed position.

As illustrated in FIG. 2, an apparatus for creating the tool case 10 of FIG. 1 comprises a mold 50 including a first mold portion 52 and a second mold portion 54. As shown in FIGS. 3A-B, the first mold portion 52 includes first and second punches 56, 58 having first and second punching surfaces 66, 68, respectively. When the first and second mold portions 52, 54 are separated, such as when a parison is being disposed in the mold 50, the first and second punches 56, 58 are in an unactivated position, as shown in FIG. 3A. As illustrated in FIG. 3B, when the first and second mold portions 52, 54 are moved adjacent each other (i.e., when the mold 50 is closed), the first and second punches 56, 58 remain in the unactivated position while the parison is being injected with blowing fluid. Accordingly, portions of the first and second punches 56, 58 form part of the surfaces against which the walls of the blow molded case are blown. Later, when it is desired to punch holes in the walls of the blow molded case, the first and second punches 56, 58 are moved to an activated position, as shown in phantom in FIG. 3B.

Figure 4A:
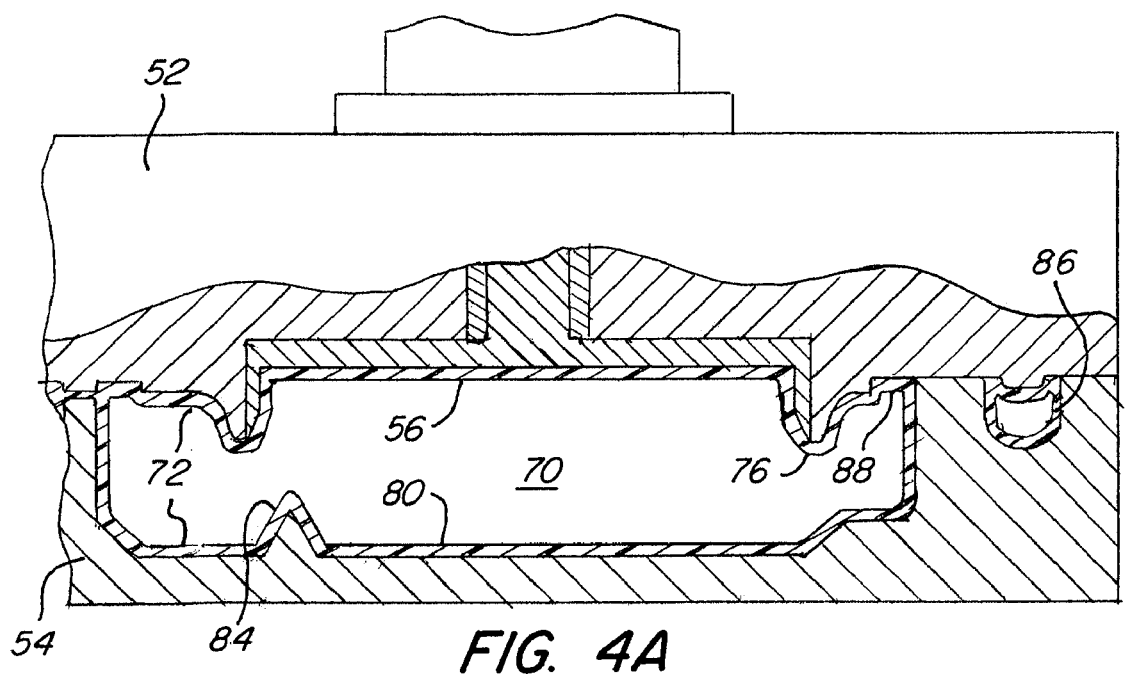
FIG. 4A is a cut-away, cross-sectional view of part of one embodiment of the apparatus of FIG. 3B where a punch is in an unactivated position.
Figure 4B:
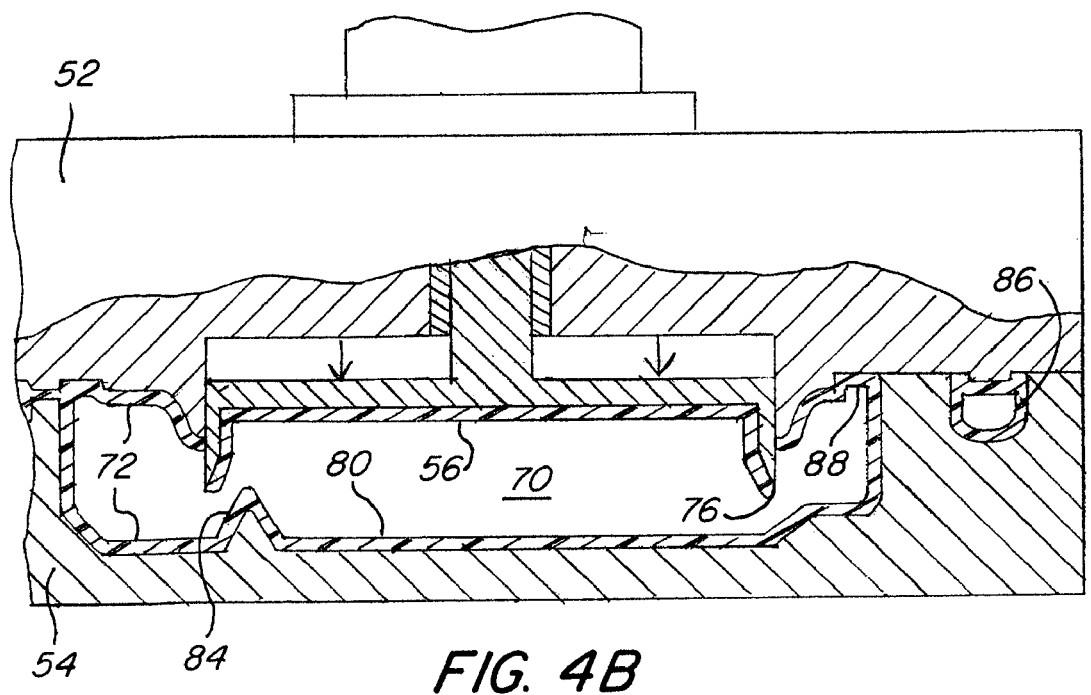
FIG. 4B is a cut-away, cross-sectional view of the apparatus of FIG. 4A where a punch is in an activated position.

The operation of the mold portion 52, 54 and punches 56, 58 is illustrated in FIGS. 4A-B. When the first mold portion 52 is adjacent the second mold portion, a cavity 70 is formed in each of the base and lid portions of the mold 50. For example, referring to FIG. 4A, when the punch 56 is in the unactivated position, the cavity 70 has a cavity surface 80 comprised of the mold surface 72 of the mold portions 52, 54 and part of the punch 56. This cavity surface 80 defines the cavity 70. When blowing fluid is injected into the parison, the wall of the blow molded case is blown against the cavity surface 80.

After a predetermined time interval, the punch 56 is moved from an unactivated position to an activated position, as illustrated in FIG. 4B. When this occurs, the punch 56 is extended past the wall of the blow molded case and into the cavity 70, thereby creating a hole in the wall of the blow molded case. The punch 56 has a punching surface 76 corresponding to the outline of the tool to be housed in the tool case 10, and thus, a hole in the shape of the tool is created in the wall of the blow molded case 10. In certain advantageous embodiments, the punching surfaces of both punches 56 and 58 correspond to the outline of the tool. By removing a large section of the walls of the blow molded case 10 at this stage, drainage of the blowing fluid is almost instantaneous. Similarly, large volumes of air can be quickly circulated inside the case 10, quickly cooling and solidifying the walls of the case. In these ways, the time required for the blow molding cycle is greatly reduced.

In some embodiments, when the punch 56 is in the unactivated position, the punch 56 protrudes out beyond the mold surface 72 into the cavity 70, as shown in FIG. 4A. As a result, when the wall of the blow molded case 10 is blown against the cavity surface 80 (which includes part of the punch 56), the wall of the case 10 is formed around the punch 56. In this way, a recessed portion is formed in the wall of the case. Accordingly, when the punch is moved to the activated position (thereby punching the tool-shaped hole 20 in the wall of the case 10 as shown in FIG. 4B) the sidewall 40 remains along the perimeter of the tool-shaped hole 20. This permits a tighter, press-fit insertion of the tool into the cavity 26.

In some embodiments, the second mold portion 54 includes a boss 84 that extends into the cavity 70. Accordingly, when the wall of the blow molded case is blown against the cavity surface 80, a boss, such as boss 46, is created. In certain of these embodiments, the boss 84 corresponds to the outline of an aperture of the tool to be housed in the case 10, such as a handle.

In certain advantageous embodiments, the first mold portion 54 includes a boss 86 so that the wall of the blow molded case 10 is formed therearound in a manner similar to boss 84, thereby producing an aperture in the wall of the case 10, such as aperture 42. In some of these embodiments, the boss 86 is specifically configured to produce an aperture adapted to receive an accessory of the tool, such as a power cord, drill bits, etc.

In some embodiments, at least one additional punch is provided in addition to the first and second punches 56, 58. Like punches 56, 58, these additional punches, when in an unactivated position, form part of the cavity surface 80 and, when in an activated position, extend out beyond the mold surface 72 to create an aperture in the wall of the blow molded case. Depending on the particular tool to be housed in the case 10 and the particular function desired, the aperture can be a through hole or a blind hole, and can be specifically configured to produce an aperture adapted to receive an accessory of the tool.

In certain advantageous embodiments, the mold surface 72 includes a recess 88 adjacent the punch 56 so that, when the wall of the blow molded case is blown against the mold surface 72, flange 44 is formed, thereby providing greater rigidity to the inner wall 32 of the case 10.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for creating a blow-molded case for housing an object, comprising:
   a mold comprising first and second mold portions that, when located adjacent each other, have first and second mold surfaces at least partially defining first and second cavities, the cavities having first and second cavity surfaces, respectively, against which first and second walls of the blow-molded case are blown, respectively, during blow molding;
   a first punch having a punching surface at least part of which corresponds to at least part of the outline of the object, wherein, when said first punch is in an unactivated position, the first cavity surface includes the first mold surface and at least part of said first punch and, when said first punch is in an activated position, at least part of said first punch is extended past the first wall of the blow-molded case and inside the first cavity such that a first hole, at least part of which corresponds to at least part of the outline of the object, is created in the first wall of the blow-molded case; and
   a second punch, wherein, when said second punch is in an unactivated position, the second cavity surface includes the second mold surface and at least part of said second punch and, when said second punch is in an activated position, at least part of said second punch is extended past the second wall of the blow-molded case and inside the second cavity such that a second hole is created in the second wall of the blow-molded case.

2. The apparatus as claimed in claim 1, wherein said second punch has a punching surface at least part of which corresponds to at least part of the outline of the object, such that, when said second punch is moved from the unactivated position to the activated position, at least part of the second hole corresponds to at least part of the outline of the object.

3. The apparatus as claimed in claim 1, wherein the outline of the object is the outline of a tool.

4. The apparatus as claimed in claim 1, wherein the full perimeter of the first hole corresponds to the full outline of the object.

5. The apparatus as claimed in claim 1, wherein, when said first punch is in the unactivated position, part of said first punch is protruding out beyond the first mold surface into the first cavity such that, when said first punch is in the unactivated position, the first wall of the blow-molded case is formed therearound and, when said first punch is in the activated position and the first hole has been created, a sidewall corresponding to the outline of the object exists along the perimeter of the hole.

6. The apparatus as claimed in claim 1, wherein the second mold portion includes at least one boss extending into at least one of the first and second cavities such that at least one of the first and second walls of the blow-molded case is formed therearound.

7. The apparatus as claimed in claim 6, wherein the outer surface of at least one boss corresponds to an outline of an aperture in the object.

8. The apparatus as claimed in claim 1, wherein the first mold portion includes at least one boss extending into at least one of the first and second cavities such that at least one of the first and second walls of the blow-molded case is formed therearound.

9. The apparatus as claimed in claim 8, wherein the outer surface of at least one boss is configured to produce an aperture in at least one of the first and second walls of the blow-molded case adapted to receive an accessory of the object.

10. An apparatus for creating a blow-molded case for housing an object, comprising;
a mold comprising first and second mold portions that, when located adjacent each other, have first and second mold surfaces at least partially defining first and second cavities, the cavities having first and second cavity surfaces, respectively, against which first and second walls of the blow-molded case are blown, respectively, during blow molding;
a first punch having a punching surface at least part of which corresponds to at least part of the outline of the object, wherein, when said first punch is in an unactivated position, the first cavity surface includes the first mold surface and at least part of said first punch and, when said first punch is in an activated position, at least part of said first punch is extended past the first wall of the blow-molded case and inside the first cavity such that a first hole, at least part of which corresponds to at least part of the outline of the object, is created in the first wall of the blow-molded case; and
an additional punch, wherein, when said additional punch is in an unactivated position, the first cavity surface includes at least part of said additional punch and, when said additional punch is in an activated position, said additional punch extends out beyond the first mold surface to a greater extent than when in the unactivated position such that an aperture is created in the first wall.

11. The apparatus as claimed in claim 10, wherein, when said additional punch is in the activated position, said additional punch is extended past the first wall of the blow-molded case and inside the first cavity.

12. The apparatus as claimed in claim 10, wherein said additional punch has a punching surface configured to produce an aperture in the first wall of the blow-molded case adapted to receive an accessory of the object.

13. The apparatus as claimed in claim 1, wherein the first mold surface includes a recess adjacent said first punch such that a flange is formed in the first wall of the blow-molded case adjacent the first hole.

14. The apparatus as claimed in claim 1, wherein the blow-molded case comprises a base portion formed in the first cavity and a lid portion formed in the second cavity.

15. A method for creating a blow-molded object case for housing an object, the method comprising:
providing a mold having first and second mold portions;
providing a first punch, wherein said first punch has a punching surface at least part of which corresponds to at least part of the outline of the object;
moving the first mold portion adjacent to the second mold portion, thereby at least partially enclosing first and second cavities having first and second cavity surfaces, respectively;
blowing a first wall of the blow-molded case against the first cavity surface and a second wall of the blow-molded case against the second cavity surface;
extending at least part of the first punch through the first wall of the blow-molded case and into the first cavity, thereby creating a first hole in the first wall of the blow-molded case;
providing a second punch; and
extending at least part of the second punch through the second wall of the blow-molded case and into the second cavity, thereby creating a second hole in the second wall of the blow-molded case.

16. The method as claimed in claim 15, wherein the second punch has a punching surface at least part of which corresponds to at least part of the outline of the object.

17. The method as claimed in claim 15, wherein the outline of the object is the outline of a tool.

18. The method as claimed in claim 15, wherein the full perimeter of the first hole corresponds to the full outline of the object.

19. The method as claimed in claim 15, wherein the first mold portion has a first mold surface at least partially defining the first cavity, further comprising positioning the first punch so that part of the first punch is protruding out beyond the first mold surface into the first cavity when the first wall is blown against the first cavity surface such that the first wall is formed therearound, and such that, when at least part of the first punch is extended through the first wall, thereby creating the first hole, a sidewall corresponding to the outline of the object exists along the perimeter of the first hole.

20. The method as claimed in claim 15, wherein the second mold portion includes at least one boss extending into at least one of the first and second cavities such that at least one of the first and second walls is formed therearound when blown against at least one of the first and second cavity surfaces.

21. The method as claimed in claim 20, wherein the outer surface of at least one boss corresponds to an outline of an aperture in the object.

22. The method as claimed in claim 15, wherein the first mold portion includes at least one boss extending into at least one of the first and second cavities such that at least one of the first and second walls is formed therearound when blown against at least one of the first and second cavity surfaces.

23. The method as claimed in claim 22, wherein the outer surface of at least one boss is configured to produce an aperture in at least one of the first and second walls adapted to receive an accessory of the object.

24. A method for creating a blow-molded object case for housing an object, the method comprising:
providing a mold having first and second mold portions;
providing a first punch, wherein said first punch has a punching surface at least part of which corresponds to at least part of the outline of the object;
moving the first mold portion adjacent to the second mold portion, thereby at least partially enclosing first and second cavities having first and second cavity surfaces, respectively, wherein the first mold portion has a first mold surface at least partially defining the first cavity;
blowing a first wall of the blow-molded case against the first cavity surface and a second wall of the blow-molded case against the second cavity surface;
extending at least part of the first punch through the first wall of the blow-molded case and into the first cavity, thereby creating a first hole in the first wall of the blow-molded case;
providing an additional punch in an unactivated position; and extending the additional punch out beyond the first mold surface to a greater extent than when in the unactivated position, thereby creating an aperture in the first wall.

25. The method as claimed in claim 24, wherein the step of extending the additional punch includes extending the additional punch past the first wall of the blow-molded case and into the first cavity.

26. The method as claimed in claim 24, wherein the additional punch has a punching surface configured to produce an aperture in the first wall adapted to receive an accessory of the object.

27. The method as claimed in claim 15, wherein the first and second mold portions have a first mold surface at least partially defining the first cavity, further comprising providing a recess adjacent the first punch such that a flange is formed in the first wall adjacent the first hole.

28. The method as claimed in claim 15, wherein the blow-molded case comprises a base portion formed in the first cavity and a lid portion formed in the second cavity.

29. A method for creating a blow-molded case for housing an object, the method comprising:
   moving a first mold portion adjacent to a second mold portion, thereby creating first and second cavities;
   blowing first and second walls of the blow-molded case against the first and second cavities, respectively;
   punching a hole, at least part of which corresponds to at least part of the outline of the object, in the first wall of the blow-molded case; and
   punching a hole in the second wall of the blow-molded case.

30. A method as claimed in claim 29, wherein at least part of the hole in the second wall of the blow-molded case corresponds to at least part of the outline of the object.

31. A method as claimed in claim 29, wherein the outline of the object is the outline of a tool.

32. A method as claimed in claim 29, wherein the full perimeter of the hole corresponds to the full outline of the object.

33. A method as claimed in claim 29, further comprising forming a sidewall along the perimeter of the hole.

34. A method as claimed in claim 29, further comprising forming a boss in at least one of the first and second walls that extends into at least one of the first and second cavities.

35. A method as claimed in claim 34, wherein the step of forming a boss includes forming a boss with an outer surface that corresponds to an outline of an aperture in the object.

36. A method as claimed in claim 34, wherein the step of forming a boss includes forming a boss with an inner surface adapted to receive an accessory of the object.

37. A method for
   creating a blow-molded case for housing an object, the method comprising:
   moving a first mold portion adjacent to a second mold portion, thereby creating first and second cavities;
   blowing first and second walls of the blow-molded case against the first and second cavities, respectively;
   punching a hole, at least part of which corresponds to at least part of the outline of the object, in the first wall of the blow-molded case; and
   punching an aperture in the first wall adapted to receive an accessory of the object.

38. A method as claimed in claim 29, further comprising forming a flange in the first wall of the blow-molded case adjacent the hole.

39. A method as claimed in claim 29, wherein the blow-molded case comprises a base portion formed in the first cavity and a lid portion formed in the second cavity.

40. A method as claimed in claim 37, further comprising forming a flange in the first wall of the blow-molded case adjacent the hole.

41. A method as claimed in claim 37, wherein the blow-molded case comprises a base portion formed in the first cavity and a lid portion formed in the second cavity.

42. A method as claimed in claim 37, wherein the outline of the object is the outline of a tool.

43. A method as claimed in claim 37, further comprising forming a sidewall along the perimeter of the hole.

44. A method as claimed in claim 37, further comprising forming a boss in at least one of the first and second walls that extends into at least one of the first and second cavities.

45. A method as claimed in claim 44, wherein the step of forming a boss includes forming a boss with an outer surface that corresponds to an outline of an aperture in the object.

46. A method as claimed in claim 44, wherein the step of forming a boss includes forming a boss with an inner surface adapted to receive the accessory of the object.

* * * * *